United States Patent [19]
Engler

[11] 3,866,040
[45] Feb. 11, 1975

[54] METHOD FOR THE CONTINUOUS TESTING OF LONG COMPONENTS FOR LEAKAGE, AND SYSTEM FOR PERFORMANCE THEREOF

[75] Inventor: Christoph Engler, Ennetbaden, Switzerland

[73] Assignee: Gesellschaft Zur Forderung Der Forschung un Der EIDG. Techn. Hochschule, Zurich, Switzerland

[22] Filed: Nov. 1, 1972

[21] Appl. No.: 302,865

[30] Foreign Application Priority Data
Nov. 19, 1971 Switzerland.................... 16857/71

[52] U.S. Cl. ............................. 250/281, 250/288
[51] Int. Cl. ............................................. H01j 39/34
[58] Field of Search .......... 250/288, 281, 282, 283, 250/272, 273

[56] References Cited
UNITED STATES PATENTS
3,247,373  4/1966  Herzog............................... 250/288
3,342,990  9/1967  Barrington........................ 250/288
3,678,271  7/1972  Groezinger....................... 250/493

FOREIGN PATENTS OR APPLICATIONS
795,418  9/1968  Canada.............................. 250/273

Primary Examiner—James W. Lawrence
Assistant Examiner—C. E. Church
Attorney, Agent, or Firm—Browdy & Neimark

[57] ABSTRACT

Method for the continuous testing of long components such as thermoelement wires by exposing the test specimen to a testing agent under pressure such as helium, followed by blasting the outer surface with air and then subjecting it to a vacuum treatment and testing the evacuated gas for traces of the agent by means of a mass spectrometer or the like and apparatus for accomplishing this method.

3 Claims, 4 Drawing Figures

METHOD FOR THE CONTINUOUS TESTING OF LONG COMPONENTS FOR LEAKAGE, AND SYSTEM FOR PERFORMANCE THEREOF

The present invention concerns a method for the continuous testing of long components for leakage, in particular for the testing of thermoelements and thermoelement wires, which method consists in exposing the test specimen to a testing agent and to pressure and subsequently cleaning it of some of the agent, and further concerns a system for the performance of the said method.

Leakage testing of thermoelements, for instance, has hitherto mainly been performed by the following two methods:

1. The thermoelement is briefly immersed in liquid air, which penetrates into any leaks and cracks present. Then the thermoelement is immersed in water on alcohol. The liquid air evaporates out of the leaks, etc. The rising bubbles indicate the faulty points. However, this method does not work where leaks are very small, and it is also laborious (handling of liquid air).

2. The thermoelement is laid in boiling water for about a day. Moisture penetrates through surface faults into the insulation and reduces the value of the latter. Such reduction is then detected by measuring the resistance between the wires or the resistance between wires and surface. This method does not permit the leaks to be located, and the time required for the test is considerable.

For the instrumentation of heating elements intended for heat transfer tests, it is necessary to have thermoelements of consistently high quality. Faults in the surface, such as cracks arising in manufacture, permit moisture to penetrate into the insulating layer and thus quite considerably impair the electrical properties thereof. For this reason, all thermoelements intended for use have to be tested for leaks throughout their length.

Accordingly, the method claimed hereunder is characterized in that it consists in passing the test specimen through an inert pressurized gas atmosphere, then cleaning it by blasting with air or the like, subsequently subjecting it to a single-stage or two-stage vacuum treatment, and investigating the evacuated gas for traces of agent by means of a mass spectrometer or the like.

The present invention is now to be described by way of example with reference to the accompanying drawings, in which FIG. 1 shows a partial longitudinal section through a system for the continuous testing of long components for leakage in particular for the testing of thermoelements and thermoelement wires;

Figure 1:
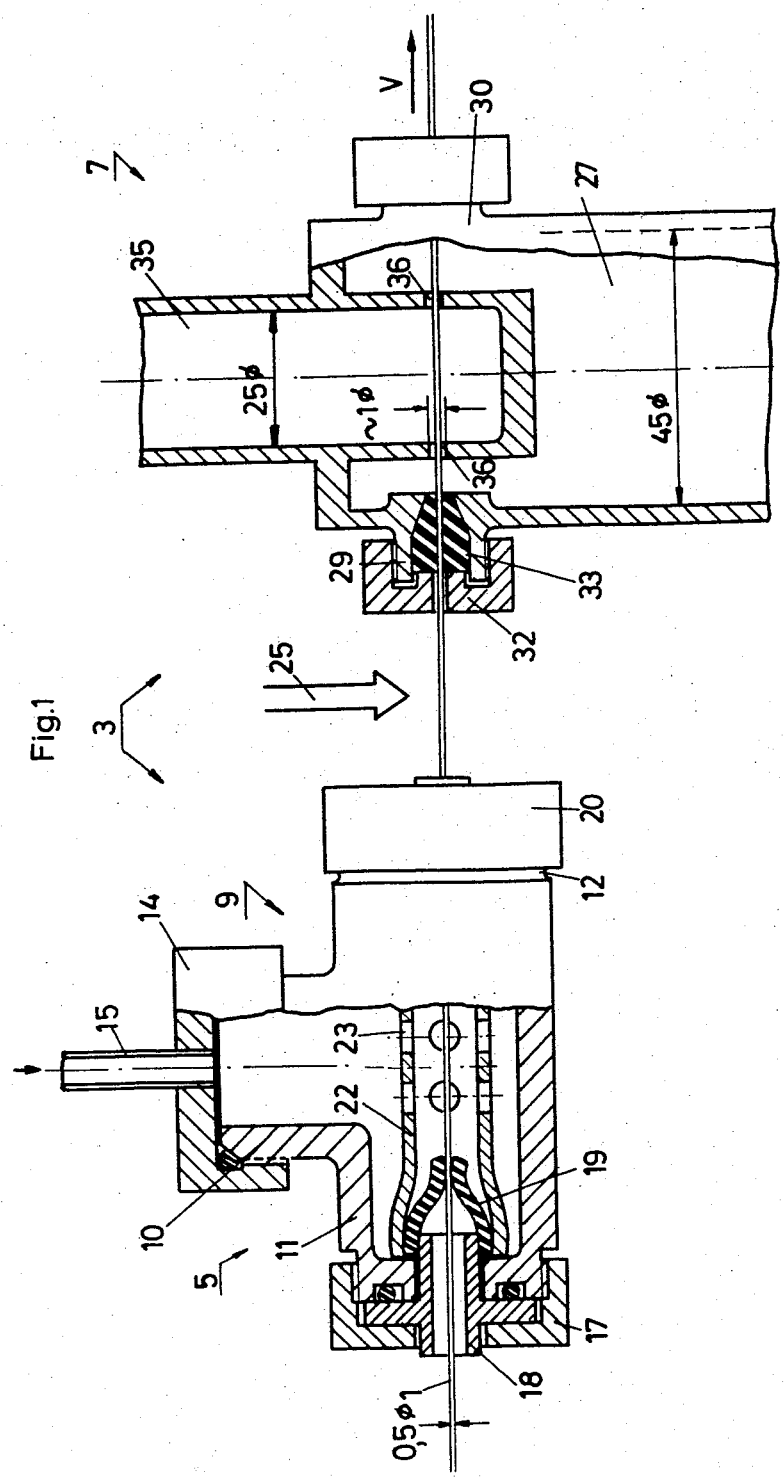

FIG. 1 shows a thermoelement 1 inserted into a pressure chamber 5. This pressure chamber 5 in conjunction with a negative pressure chamber 7 represents the test system 3. The pressure chamber 5 presents a T-shaped piece 9 with stubs 10, 11, 12 which are provided with cap nuts 14, 17, 20. The cap nut 14 is joined, as by soldering, to a connecting tube 15, while the cap nut 17 serves to clamp a holder 18, to whose end extending into the interior of the T-shaped piece 9 is connected a shrink tube 19. The latter serves as an air lock, and its free end is closed when the pressure chamber 5 is under positive pressure. A holding tube 22 is slipped over the shrink tube 19 and holds it fast on the holder 18. This holding tube 22 presents apertures 23, which admit into the tube 22 the pressure prevailing in the T-shaped piece 9.

The arrow 25 indicates the direction of an air stream, which is blown at practically right angles on to the thermoelement 1. The adjoining negative pressure chamber 7 comprises a pre-evacuation chamber 27 with an inlet stub 29 and an outlet stub 30. The inlet stub 29 is provided with a cap nut 32 serving to receive a rubber stuffing box 33. The thermoelement 1 is passed through the stuffing box without any play. Leading into the upper part of the pre-evacuation chamber 27 is the actual vacuum chamber 35, which presents lateral apertures 36 for the insertion of the thermoelement 1.

Figure 2:
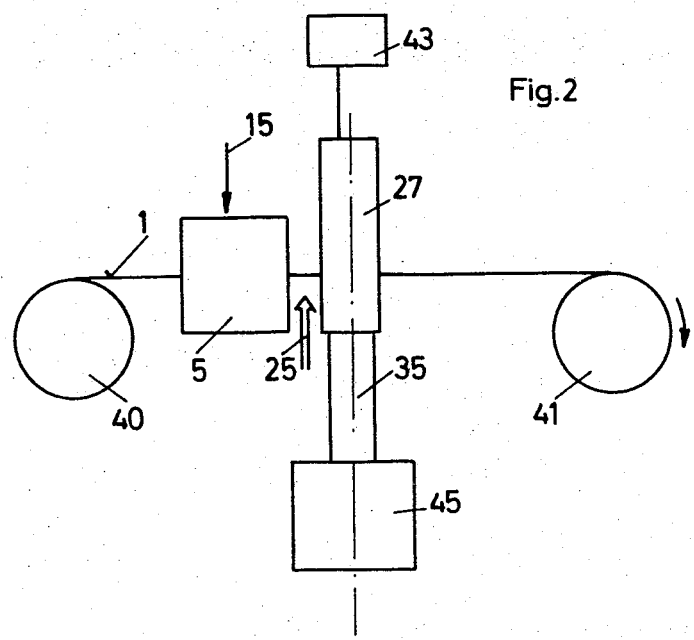
FIG. 2 shows a block diagram of a system according to FIG. 1.
Figure 3:
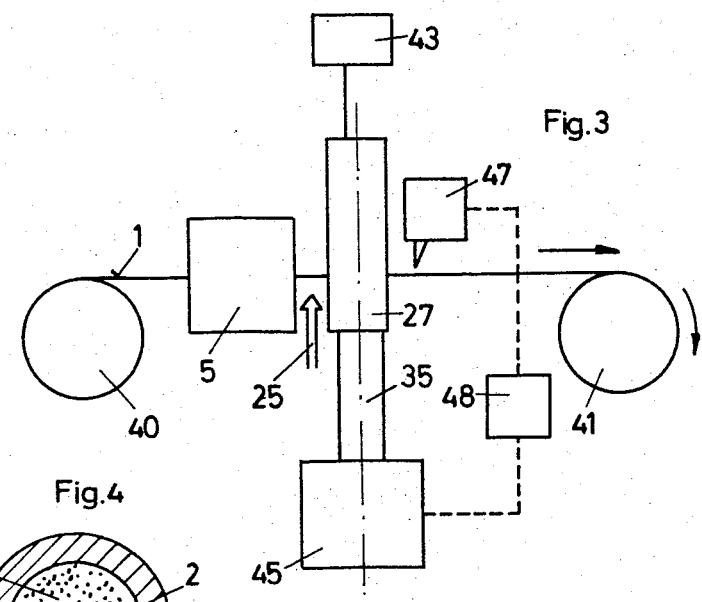
FIG. 3 shows a block diagram of a system analogous to that in FIG. 1, with an additional marking device for the leaks and a delay means necessitated thereby.

FIGS. 2 and 3 show a block diagram of the system in a simpler version (FIG. 2) and with additions (FIG. 3). In this case, the thermoelement 1 is drawn off a reel 40 and, after the test, is wound on to a reel 41. Also shown is the vacuum pump 43 for the evacuation of the vacuum chamber 35 and the pre-evacuation chamber 27. The two chambers 27 and 35 are arranged 20 mm apart, for instance. Purely for the purposes of representation, the vacuum chamber 35 is passed through the pre-evacuation chamber 27, with a helium leak detector 45 arranged at the end of the vacuum chamber 35. Such helium leak detectors are mass spectrometers for helium and are commercially available. They are not part of the subject of the present invention.

Figure 4:
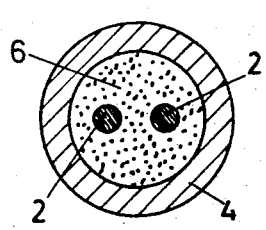
FIG. 4 shows a cross-section through a thermoelement.

The system according to FIG. 3 is in addition provided with a marking device 47, which is controlled by the leak detector 45 in conjunction with a means 48. The delay means 48 allows for the time required by the thermoelement to pass from the vacuum chamber 35 to the point of marking by the marking device 47. The installed thermoelement 1 presents the following construction (FIG. 4): Two wires 2 which are connected with electrically conductive effect at the measuring point and which thus form a thermocouple are surrounded by a tube 4, made of stainless steel, for instance, for protection from external damage. The space between the tube 4 and the two wires 2 is filled with an electrically insulating powder, such as ceramic powder.

The system described functions as follows:

A thermoelement 1 to be tested for leakage, which is wound on to the reel 40, is passed into the cap nut 17 and through the shrink tube 19 into the holding tube 22 and leaves the pressure chamber 5 through the stub 12 and the cap nut 20. It subsequently passes through the cap nut 32 and the rubber stuffing box 33 into the pre-evacuation chamber 27, through which it travels for the purpose of passing through the lateral aperture 36 into the interior of the vacuum chamber 35. It leaves the latter through the other aperture 36, passes through the pre-evacuation chamber 27 and leaves it through its second stub 30 and the cap nut of the latter. The tested thermoelement 1 is then wound on to the reel 41.

For testing the thermoelement 1, helium is forced through the connecting tube 15 into the pressure chamber 5, so that the latter when filled presents a positive pressure with respect to the outside air. The positive pressure closes the shrink tube 19. The free end of the latter clasps the thermoelement 1, as seen in FIG. 1, and prevents the helium from escaping to the outside. The helium passes through the apertures 23 into the holding tube 22. The righthand side of the T-shaped piece 9 is formed analogously. Now, when the thermoelement 1 passes into the helium atmosphere in the pressure chamber 5, the helium penetrates into any cracks present in the tube 4 and passes into the ceramic powder 6, where it is retained.

Having left the pressure chamber 5, the thermoelement 1 is exposed to the air stream 25, which clears the surface of helium. Yet the air stream cannot penetrate into the tube 4, so that the helium trapped by the powder 6 outlasts the external cleaning. Then the outwardly air-cleaned thermoelement 1 passes into the pre-evacuation chamber 27, where another superficial cleaning takes place. This purpose is also served by the rubber stuffing box 33 in a mechanical manner. This second cleaning in the pre-evacuation chamber 27 may well remove certain traces of helium present in the outer zones of the fault. However, the actual extraction of the traces from the powder 6 and, accordingly, the detection of a surface fault is effected in the vacuum chamber 35. From the helium evacuated from the powder 6, the helium detector 45 connected to the vacuum chamber 35 detects a fault in this part of the thermoelement 1. It indicates it accordingly. The faulty part can be cut away from the thermoelement 1. For continuous operation, however, the system is provided with the marking device 47 shown in FIG. 3 which, in conjunction with the leak detector 45 and an interposed delay means 48, marks the faulty point on the thermoelement.

The leak detector 45 gives a signal when the leak in the thermoelement surface passes the chamber 27. The signal serves to control the marking device 47. To ensure that the marking is made approximately at the correct point of the surface, the delay means 48, which can be set according to the advance rate of the thermoelement, is interposed.

Thermoelements are bought in lengths of 100 meters, cut to length and processed according to needs. As much as 15 meters of thermoelement may be installed in a single heating element, according to the number of measuring points. Such thermoelements present outside diameters of 0.5 mm, for instance. The advance rate of the thermoelement in the system is normally 5 to 30 mm/sec. The testing method is continuous. It is thus possible with a reasonable effort to perform the leak testing of great lengths of commercial thermoelement wire, 100 meters and over, and also the current subsequent tesing of the special thermoelements manufactured therefrom.

I claim:

1. An apparatus for the continuous testing of a wire-shaped component of indefinite length for faults in the surface thereof comprising:

helium chamber means for establishing an atmosphere of helium at a pressure greater than atmospheric;

blasting means for cleaning the surface of components passing therethrough by blasting with air;

vacuum chamber means for establishing an atmosphere therein below atmospheric;

analyzer means comprising a mass spectrometer, for analyzing gas evacuated from said vacuum chamber means for the presence of traces of helium;

feed means for continuously feeding the indefinite length component through said helium chamber means, said blasting means and said vacuum chamber means; and sealing means for sealing said helium chamber means and said vacuum chamber means from the outside atmosphere as the indefinite length component is continuously fed therethrough, wherein said helium chamber means, said blasting means and said vacuum chamber means are sequentially aligned with respect to said feed means such that said helium chamber means, said blasting means and said vacuum chamber means can simultaneously act on different portions of the same indefinite length component.

2. An apparatus in accordance with claim 1 wherein said vacuum chamber means comprises a first stage and a second stage, wherein said first stage is for further cleaning of the surface of the component, and wherein said analyzer means only analyzes the gas evacuated from the second stage of said vacuum chamber means.

3. An apparatus in accordance with claim 1 wherein said analyzer means further gives a signal when helium is detected from the portion of the component then within said vacuum chamber means, and further including marking means for marking the surface of the component upon receipt of a signal from said analyzer means, and delay means for delaying the signal given by said analyzer means from reaching said marking means for a period of time equal to the period of time necessary for the portion of the component within said vacuum chamber means when the helium is detected to reach said marking means.

* * * * *